United States Patent [19]

Rogers

[11] 4,359,971
[45] Nov. 23, 1982

[54] STEAM INJECTION APPARATUS FOR INTERNAL COMBUSTION ENGINE

[76] Inventor: Jasper Rogers, 120 N. Val Vista Dr., Mesa, Ariz. 85203

[21] Appl. No.: 116,276

[22] Filed: Jan. 28, 1980

[51] Int. Cl.³ .............................................. F02D 19/00
[52] U.S. Cl. .................................. 123/25 P; 123/1 A; 123/25 B; 123/25 D
[58] Field of Search .................. 123/25 P, 25 B, 25 D, 123/1 A

[56] References Cited

U.S. PATENT DOCUMENTS

| | | | |
|---|---|---|---|
| 1,133,665 | 3/1915 | Burns | 123/25 P |
| 1,711,408 | 4/1929 | Fritz | 123/25 B |
| 1,730,089 | 10/1929 | Nimrick et al. | 123/25 B |
| 2,674,235 | 4/1954 | Drydyke | 123/25 B |
| 2,811,146 | 10/1957 | Spillmann | 123/25 B |
| 4,059,078 | 11/1977 | dela Rosa | 123/25 P |

FOREIGN PATENT DOCUMENTS 432844  3/1948  Italy .................................. 123/25 B

*Primary Examiner*—Charles J. Myhre
*Assistant Examiner*—E. Rollins Cross
*Attorney, Agent, or Firm*—Gregory J. Nelson

[57] ABSTRACT

An apparatus for controlling the injection of steam into the intake manifold of an internal combustion engine having an exhaust attachable evaporation plate supplied with water by a reservoir across a float bowl. A restrictor is placed in the line connecting the float bowl and evaporator. The evaporator plate defines a bore and is insulated from the exhaust pipe by a heat resistant gasket having an aperture of predetermined area. Boiling and steam generation are restricted primarily in the region between the gasket and line restrictor.

6 Claims, 8 Drawing Figures

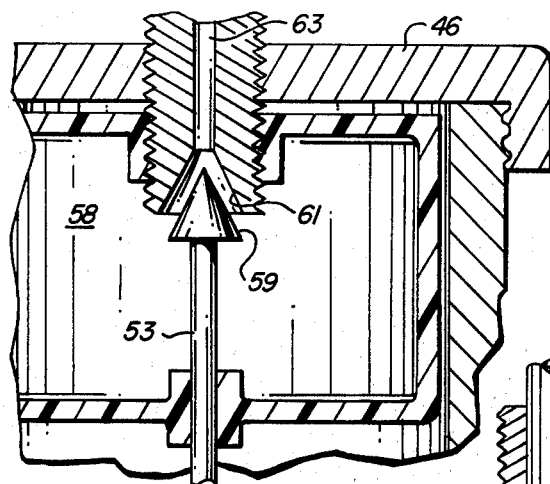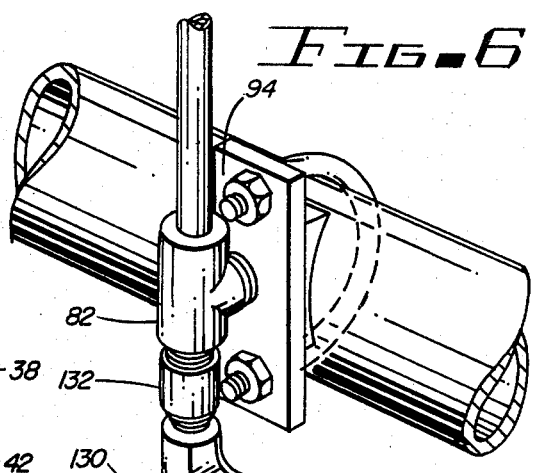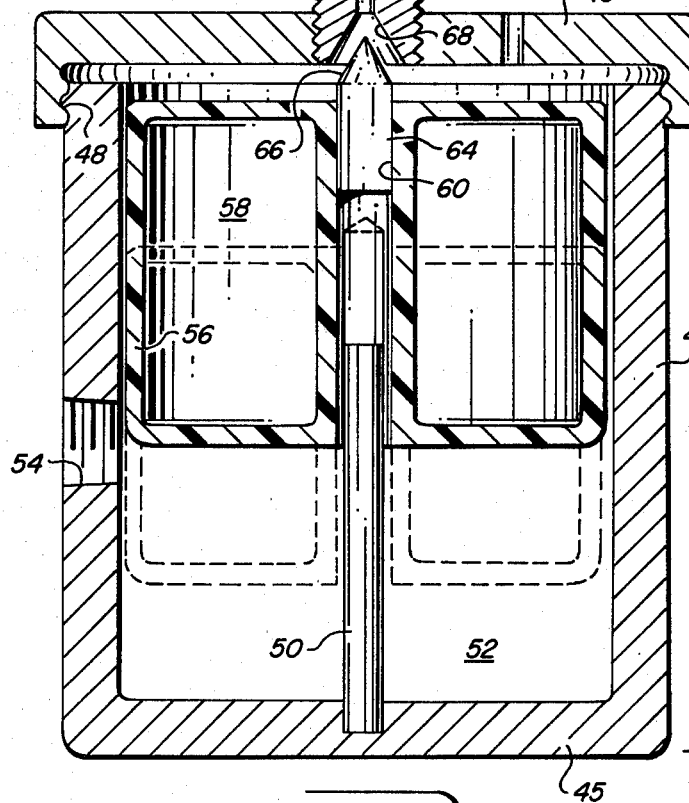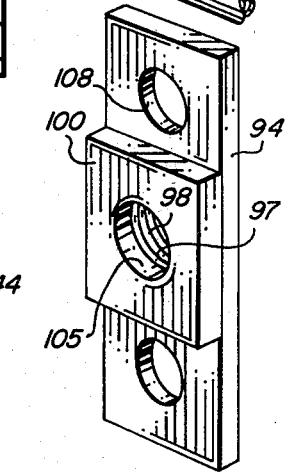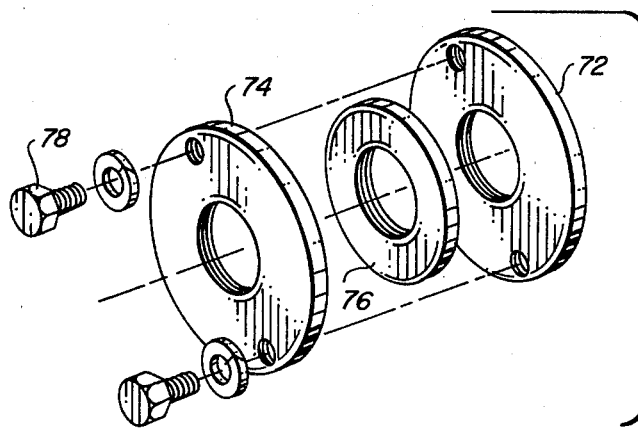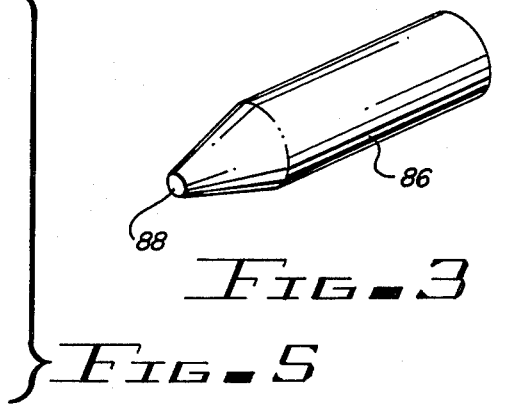

STEAM INJECTION APPARATUS FOR INTERNAL COMBUSTION ENGINE

The present invention relates to a device for improving the performance and efficiency of internal combustion engines and more particularly relates to an apparatus for introducing steam or water vapor into the intake manifold of an internal combustion engine.

Introduction of water vapor or steam into the intake manifold or combustion zones of an internal combustion engine in order to improve efficiency and suppress combustion has been known for many years. A multiplicity of devices have been proposed for this purpose. These devices generally reduce contaminants in the exhaust gas by modifying the air fuel ratio or suppressing combustion. Devices of this general type are shown in the U.S. Pat. Nos. 1,133,665, 1,686,470, 2,811,146, b,730,089 and 4,059,078. Notwithstanding, the advantages to be obtained from the devices of the type exemplified in the prior art patents cited above, devices of this general type have presented certain problems. Some devices are unduly complex and require constant adjustment or regulation to establish the proper rate of introduction of steam or water vapor. Others do not lend themselves to installation into existing engines.

Accordingly, there exists a need for a simple and effective device for introducing water vapor and/or steam into the combustion zone of an internal combustion engine. Briefly, the present invention provides a steam injection device consisting of a reservoir containing a supply of water. The reservoir communicates with a float chamber which serves to regulate the flow of water across an orifice or restriction to an evaporization chamber at an evaporator. The water is evaporated at the evaporator and the substantially dry steam obtained from the evaporator is injected into the intake manifold or combustion zone of the engine. The evaporization chamber is formed in a plate securable at a location along the exhaust pipe, and the size of the evaporization chamber may be varied by insertion of an appropriately apertured gasket between the plate and exhaust pipe. The evaporator is heat insulated from the reservoir.

The present invention will be better understood and additional objects and advantages will become apparent from the following description of the preferred embodiment illustrated in the accompanying drawings in which:

FIG. 3 is a perspective view of the nozzle;

FIG. 4 is a cross sectional view of the float chamber;

FIG. 5 is an exploded perspective view illustrating the insulation brackets inserted between the evaporator and float chamber;

FIG. 6 illustrates an alternate mounting of the evaporative chamber to the exhaust pipe;

FIG. 7 is a perspective view of the evaporator plate defining the evaporator; and FIG. 8 illustrates an alternate valving arrangement for the float bowl.

Figure 1:
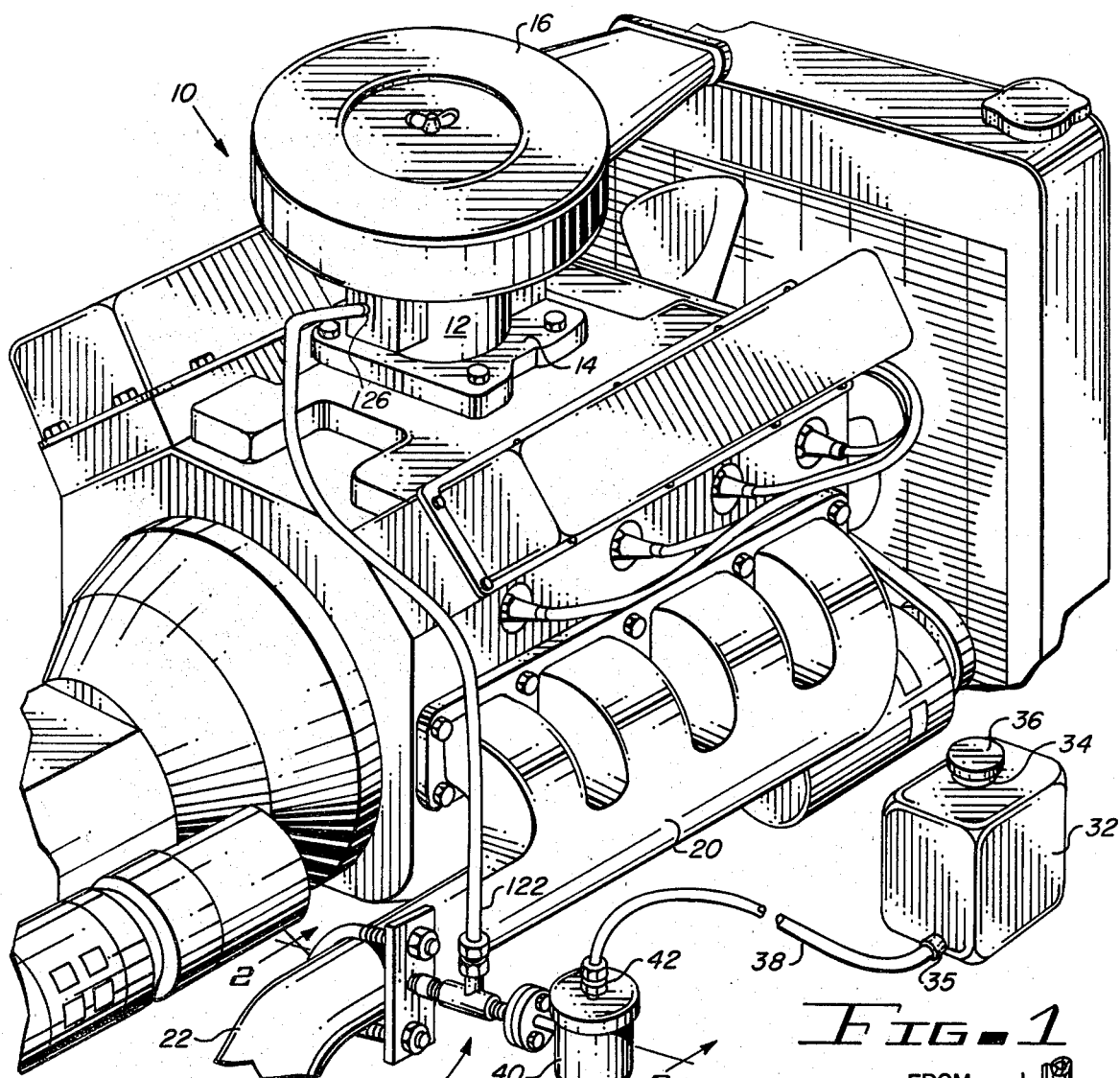
FIG. 1 is a perspective of an automobile engine employing the present invention.

Turning now to the drawings, a conventional internal combustion engine of the spark ignition type is shown in FIG. 1 and is generally designated by the numeral 10. Engine 10 is of conventional design having carburetor 12 mounted on intake manifold 14 for supplying the necessary air-fuel mixture to support combustion. Air is introduced into the carburetor through the air cleaner assembly 16 mounted on the carburetor 12. Products of combustion are discharged from the cylinders through the exhaust manifold 20 which is connected to an exhaust pipe 22. The other components of the engine 10 are conventional and well known in the art and detailed discussion of these features is not believed necessary as the engine per se forms no part of the present invention.

The water injection system associated with the engine 10 is generally designated by the numeral 30 and includes a reservoir 32 mounted at an appropriate location in the engine compartment or other location in the vehicle. Reservoir 32 is shown as a metal or plastic container having a neck or opening 34 and cap 36. Periodically, when necessary, the user will fill the reservoir 32 from an appropriate water source. The reservoir 32 can be of any suitable shape; for purposes of representation, reservoir 32 has been shown as a generally rectangular container suitably vacuum formed or blow molded from a heat resistant plastic.

Flexible conduit 38 is connected to a fitting 35 in the bottom of reservoir 32. The opposite end of conduit 38 is connected to float chamber 40 at hose fitting 42.

Float bowl 40, as best seen in FIG. 4, includes a generally cylindrical body 44 and bottom 45 defining float chamber 52 closed by a cap 46 at threads 48 at the upper edge of body 42. Fitting 42 is in threaded engagement with cap 46 along the axial center line of body 44. A guide pin 50 extends axially within chamber 52 and terminates at a location above outlet 54 in side wall 44. An annular float 56 is hollow having buoyancy chambers 58. A central bore 60 receives guide 50. Float 56 is vertically slidable along guide pin 50. The upper end of bore 60 receives a valving pin 64 having an upper generally convex surface 66 which is cooperable with surface 68 of fitting 42. When the float 56 is in the uppermost position, valving needle member 64 will seat against surface 68 terminating flow to chamber 52. As the water level in 52 drops as it is discharged at outlet 54, valving needle member 66 will unseat from surface 68 permitting a flow of water into the chamber via conduit 38. Surface 68 is shown as defining an acute angle typically the included angle being about 10° to 20° for best results.

FIG. 8 illustrates an alternate valving arrangement in which valving pin 59 is vertically moveable against seat 61 to control admission of water through passageway 63. The upper surface 65 of float 56 engages the plunger 53 of pin 59 when the water level increases to a predetermined level causing water flow to be terminated.

Figure 2:
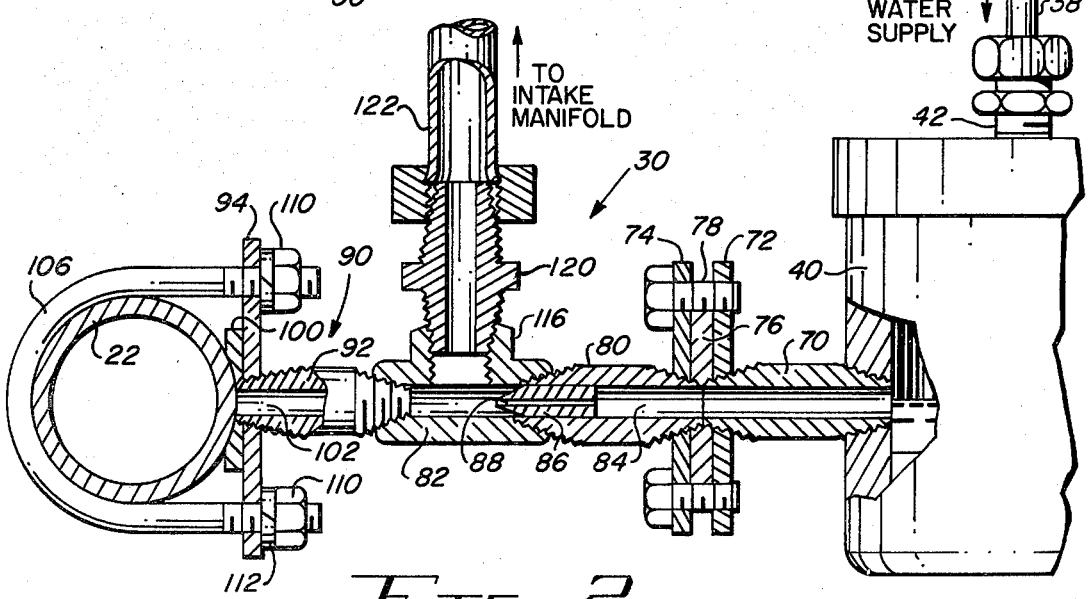
FIG. 2 is a sectional view taken along lines 2—2 of FIG. 1.

As seen in FIGS. 2 and 5, fitting 70 is in threaded engagement with outlet 54, the opposite end of fitting 70 being n threaded engagement with circular flange 72. A second flange 74 is spaced apart from flange 72 and suitable insulation material such as an asbestos gasket 76 is interposed between the flanges and held in place by bolts 78.

Fitting 80 is in threaded engagement with flange 74 and connects flange 74 to tee fitting 82. A flow passage 84 is defined by fitting 70, gasket 76 and fitting 80 leading from the chamber 52 of the float chamber to tee 82. A nozzle or restrictor 86 having a reduced flow passage diameter 88 is inserted in passageway 84 at a suitable location, as for example, at one end of fitting 80. Nozzle 86 serves to restrict the flow rate and increase the velocity of the water delivered to the evaporator and to the intake manifold. Tee 82 is connected to evaporator 90 by fitting 92.

Evaporator 90, as best seen in FIGS. 2 and 7, includes an evaporator plate 94 having a bore 97 defining internal threads 98 which receive fitting 92. Spacer 100, in the form of a gasket of asbestos or similar heat resistant material is interposed between exhaust pipe 22 and plate 94. Spacer 100 defines an aperture 105 which regulates the rate of steam generation in bore 97. Plate 94 is held in tight engagement against exhaust pipe 22 by U-bolt 106 extending through holes 108 at opposite ends of plate 94. Nuts 110 and lock washers 112 secure the plate in this position. It will be apparent that water or liquid introduced into chamber 102 formed at the evaporator 90 will be heated sufficiently by the exhaust gases and exhaust pipe 22 to evaporize the water. The evaporized vapor is discharged from tee 82 at outlet 116 which is connected to conduit 122 by a fitting 120. Conduit 122 is connected to the intake manifold or carburetor at the butterfly valve at fitting 126. Various materials can be used; it being apparent that conventional tubing and fittings of copper and brass will work well for this purpose.

The present invention will be more fully understood by the following description of operation. Reservoir 32 is mounted at a suitable location in the vehicle sections within the engine compartment. Evaporator 90 and gasket 100 are secured to the exhaust pipe 22 in an accessible location. Evaporator 90 and gasket 100 are secured to the exhaust pipe 22 by U-bolt 106 extending through the evaporator plate and gasket. Note that the attachment of the evaporator plate does not require any drilling or tapping or special adaptation of the exhaust system. Gasket 100 is selected having an aperture 105 sized according to the engine size and characteristics. Once evaporator plate 94 has been secured in place, fitting 92 is engaged in plate 94. Tee 82 is then secured to fitting 92. In some installations, as shown in FIG. 6, it may be necessary to insert an ell 130 and an additional fitting 132 prior to connecting tee 82. Once tee 82 has been secured in place, it is connected to the float bowl 40 with the insulation material 76 and flanges 72 and 74 in place. Reservoir 32 is connected to the float bowl 40 by conduit 38. Once this simple installation is accomplished, the tee 82 can be connected to manifold 14 at fitting 126 which is tapped into the manifold and the system is ready for use. It will be apparent alcohol or other fuel additives can also be used to the reservoir and supplied to the engine.

Once the engine has started, the hot exhaust gases pass through exhaust pipe 22 and will heat the area of the pipe adjacent the evaporator plate 94. Water from reservoir 32 will be delivered, under control of float valve 40, to the chamber area 102 defined by aperture 105, bore 97 and the interior of tee 82.

As best illustrated in FIG. 4, as the water level within chamber 52 drops, valve member 64 will move away from seat 68 permitting additional water to enter chamber 52 through conduit 38. Water from the float chamber is delivered via passageway 84 across restriction or nozzle 86. The reduced flow passage 88 will regulate the flow of water to the evaporator chamber and cause an attendant increase in velocity of the water passing therethrough. Since reduced atmospheric pressure exists within the intake manifold, steam generated at the evaporator chamber will be induced into the intake manifold and to the combustion area with the charge of air and fuel passing from the carburetor. The steam entering into the combustion areas will serve to improve the operation, efficiency and quality of the exhaust gases as is well known in the art.

Insulation gasket 76 prevents water in the float bowl 40 from boiling. The rate of steam production is controlled by orifice 86 and the size of the aperture 105 is gasket 100. These components may be changed or selected according to engine size and characteristics. Further, the restriction 86 and gasket 100 help to localize the steam generation to the zone immediately adjacent tee 82 between the heat resistant gasket 100 and restrictor 84.

From the foregoing, it will be seen that the present invention provides a simple and reliable apparatus for introducing steam to a combustion engine. The device utilizes conventional components and may be easily retrofit by the owner or mechanic in a short period of time. No adaptations or modifications are required to the engine. Further, the system is self-regulating and water is delivered to the small evaporator chamber on a demand basis.

The system described above has been installed and tested on several engines including 6 cylinder Volvo engine, model 164. The engine had approximatley 70,000 miles on it when the system was installed. The results, as demonstrated by a test conducted Hamilton Test Systems at a State of Arizona Vehicle Emission Testing Station, indicated an approximate 50% reduction in hydrocarbons at idle conditions which constitutes a major portion of city driving. Carbon monoxide levels, which were already below acceptable levels, also experienced a drop from 2.39% at idle to 0.25%.

Improved results observed include increased engine efficiency, more power, longer spark plug life and longer oil life.

It will be necessary to those skilled in the art to make various changes, alterations and modifications to the apparatus described herein. To the exent that these changes, alterations and modifications do not depart from the spirit and scope of the appended claims, they are intended to be encompassed therein.

I claim:

1. Steam vaporization apparatus for use with an internal combustion engine having an intake manifold and an exhaust system including an exhaust pipe, said apparatus comprising:
   (a) evaporator means defining an evaporator chamber therein;
   (b) means for attaching said evaporator immediately adjacent said exhaust pipe in heat exchange relationship therewith;
   (c) a reservoir;
   (d) a liquid bowl connected to said reservoir and having a float valve associated therewith and an outlet, said float valve adapted to maintain the level in said bowl at or above said outlet;
   (e) first conduit means connecting said bowl to said evaporator whereby gravity flow of water is substantially continually induced from said reservoir to said evaporator chamber;
   (f) second conduit means connected to said evaporator chamber and in communication therewith connected to the internal combustion engine at the intake manifold thereby establishing a closed system from said reservoir to said manifold; and
   (g) flow restrictor means interposed between said float bowl and said evaporator chamber in said first conduit said flow restrictor means comprising a nozzle having a reduced flow passageway diameter whereby water delivered to said evaporatization chamber across said restrictor and is vaporized and delivered to the intake manifold and backflow of steam to the liquid bowl is restricted.

2. The apparatus of claim 1 further including needle valve means operatively associated with said float valve to control the rate of flow from the said float bowl.

3. The apparatus of claim 1 further including heat insulation means interposed in said first conduit.

4. Steam evaporatization apparatus for use with an internal combustion engine having an intake manifold and an exhaust system including an exhaust pipe, said evaporatization apparatus comprising:

(a) evaporator means defining an evaporator chamber therein, said evaporator means including a tee-fitting having at least first, second and third outlets, and an evaporator plate secured at said exhaust pipe having a bore therein and said evaporator plate engaging said tee-fitting at said third outlet;

(b) means for attaching said evaporator immediately adjacent said exhaust pipe in heat exchange relationship therewith;

(c) a reservoir;

(d) a liquid bowl connected to said reservoir having a float valve associated therewith and an outlet, said float valve adapted to maintain the level in said bowl at or above said outlet;

(e) first conduit means connecting said bowl to the said first outlet of the said tee-fitting whereby gravity flow of water is substantially and continually induced from said reservoir to said evaporator chamber.

(f) second conduit means connected to the said second outlet of said tee-fitting and in communication therewith connected to the internal combustion engine at the intake manifold thereby establishing a closed system from said reservoir to said manifold; and (g) flow restrictor means interposed between said float bowl and said evaporator means in said first conduit said flow restrictor means comprising a nozzle having a reduced flow passageway diameter whereby water delivered to said evaporation chamber across said restrictor is vaporized and delivered to the intake manifold.

5. The apparatus of claim 4 wherein said float valve comprises a float in said bowl, a needle valve operatively carried on said float and seat means in said bowl at said outlet.

6. The apparatus of claim 4 further including heat resistant gasket means having an aperture therein interposed between said evaporator plate and the exhaust pipe with the aperture in the gasket in alignment with the said bore in said evaporator plate.

* * * * *